US011138481B2

(12) United States Patent
Morozumi

(10) Patent No.: US 11,138,481 B2
(45) Date of Patent: Oct. 5, 2021

(54) CONTROL METHOD OF CARD ISSUE DEVICE AND CARD ISSUE DEVICE

(71) Applicant: NIDEC SANKYO CORPORATION, Nagano (JP)

(72) Inventor: Shinya Morozumi, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 121 days.

(21) Appl. No.: 16/488,631

(22) PCT Filed: Feb. 7, 2018

(86) PCT No.: PCT/JP2018/004136
§ 371 (c)(1),
(2) Date: Aug. 26, 2019

(87) PCT Pub. No.: WO2018/155180
PCT Pub. Date: Aug. 30, 2018

(65) Prior Publication Data
US 2021/0133519 A1 May 6, 2021

(30) Foreign Application Priority Data
Feb. 27, 2017 (JP) .............................. JP2017-034752

(51) Int. Cl.
G06K 13/07 (2006.01)
G06K 13/06 (2006.01)

(52) U.S. Cl.
CPC ............. G06K 13/07 (2013.01); G06K 13/06 (2013.01)

(58) Field of Classification Search
None
See application file for complete search history.

(56) References Cited

FOREIGN PATENT DOCUMENTS

| JP | H0531981 A | | 2/1993 |
|---|---|---|---|
| JP | 2000099806 A | * | 4/2000 |
| JP | 2000099806 A | | 4/2000 |
| JP | 2000222608 A | * | 8/2000 |
| JP | 2000222608 A | | 8/2000 |
| JP | 2006031432 A | | 2/2006 |
| JP | 2013239003 A | * | 11/2013 |
| JP | 2013239003 A | | 11/2013 |
| JP | 2015176593 A | | 10/2015 |

OTHER PUBLICATIONS

International Search Report corresponding to Application No. PCT/JP2018/004136; dated Apr. 3, 2018.

* cited by examiner

Primary Examiner — Kristy A Haupt
(74) Attorney, Agent, or Firm — Cantor Colburn LLP

(57) ABSTRACT

A control method of a card issue device may include a card direction determination step including taking the card into the card reader before the card is issued and determining a direction of the card; and a card issue step comprising issuing the card is executed based on the card direction determined in the card direction determination step.

15 Claims, 8 Drawing Sheets

| No. | JIS2-1 | ISO-1 | JIS2-2 | ISO-2 | GROUP |
|---|---|---|---|---|---|
| 1 | × | × | × | × | Group 0 |
| 2 | ○ | × | × | × | Group 1 |
| 3 | × | ○ | × | × | Group 1 |
| 4 | ○ | ○ | × | × | Group 1 |
| 5 | × | × | ○ | × | Group 2 |
| 6 | ○ | × | ○ | × | Group 3 |
| 7 | × | ○ | ○ | × | Group 1 |
| 8 | ○ | ○ | ○ | × | Group 1 |
| 9 | × | × | × | ○ | Group 2 |
| 10 | ○ | × | × | ○ | Group 1 |
| 11 | × | ○ | × | ○ | Group 3 |
| 12 | ○ | ○ | × | ○ | Group 1 |
| 13 | × | × | ○ | ○ | Group 2 |
| 14 | ○ | × | ○ | ○ | Group 1 |
| 15 | × | ○ | ○ | ○ | Group 1 |
| 16 | ○ | ○ | ○ | ○ | Group 3 |

FIG. 5

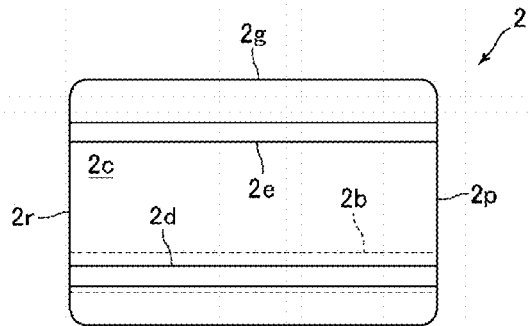
FIG. 8A
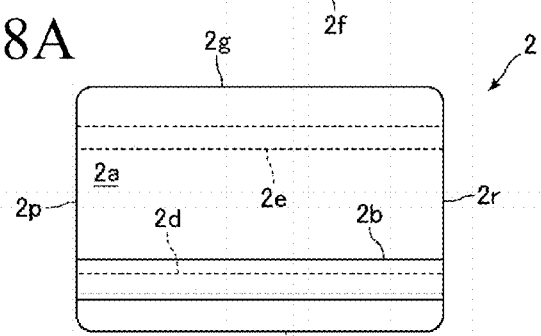
FIG. 8B
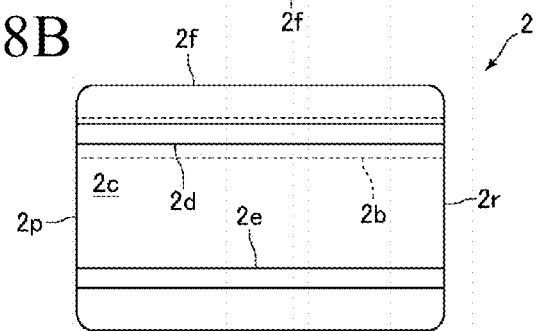
FIG. 8C
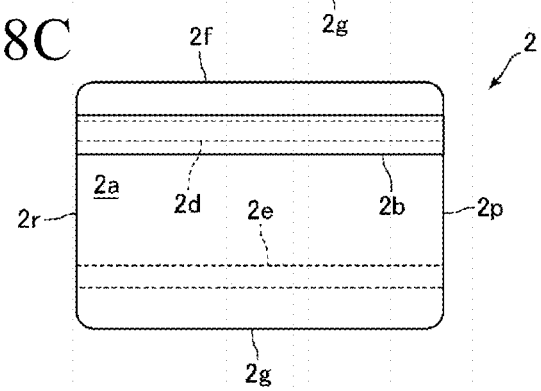
FIG. 8D
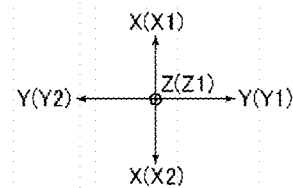

CONTROL METHOD OF CARD ISSUE DEVICE AND CARD ISSUE DEVICE

CROSS REFERNECE TO RELATED APPLICATIONS

This is the U.S. national stage of application No. PCT/JP2018/004136, filed on Feb. 7, 2018. Priority under 35 U.S.C. § 119(a) and 35 U.S.C. § 365(b) is claimed from Japanese Application No. 2017-034752, filed Feb. 27, 2017; the disclosures of which are incorporated herein by reference.

TECHNICAL FIELD

At least an embodiment of the present invention relates to a control method of a card issue device from which a card is issued. Further, at least an embodiment of the present invention relates to a card issue device from which a card is issued.

BACKGROUND

Conventionally, a card issue device structured to issue a card has been known (see, for example, Patent Literature 1). The card issue device described in Patent Literature 1 includes two card readers structured to perform reading of data recorded in a card and recording of data to the card, a printer structured to print on a card, a labelling machine structured to stick a label on a card, five card accommodation parts in which cards before issue are accommodated, a card taking-out part for taking out a card to be issued, a card collection part in which an unnecessary card is collected, and a card conveyance mechanism structured to convey a card between these structures. In this card issue device, data are recorded in the card reader on a card which has been conveyed from the card accommodation part, and/or printing is performed by the printer and then, the card is conveyed to the card taking-out part and the card is issued.

In the card issue device described in Patent Literature 1, two card readers are disposed so as to be adjacent to each other, and a conveyance direction of a card conveyed in one of the two card readers and a conveyance direction of a card conveyed in the other card reader are set to be parallel to each other. Further, in one of the two card readers, a magnetic head is disposed on one side in a width direction of a card conveyed in an inside of the card reader and, in the other card reader, a magnetic head is disposed on the other side in a width direction of a card conveyed in the card reader.

Further, a card used in the card issue device described in Patent Literature 1 is formed with a magnetic stripe in which magnetic data are recorded. Specifically, as shown in FIG. 3A and FIG. 3B a magnetic stripe 2b is formed on a back face 2a of a card 2, and two magnetic stripes 2d and 2e are formed on a front face 2c of the card 2. In the card issue device described in Patent Literature 1, recording of magnetic data to magnetic stripes 2b and 2d and reading of magnetic data recorded in the magnetic stripes 2b and 2d are performed by magnetic heads of one of the two card readers, and recording of magnetic data to a magnetic stripe 2e and reading of magnetic data recorded in the magnetic stripe 2e are performed by a magnetic head of the other card reader.

CITATION LIST

[Patent Literature 1] Japanese Patent Laid-Open No. 2015-176593

In the card issue device described in Patent Literature 1, a case may occur that cards are accommodated in the card accommodation part in an incorrect direction due to an error of an operator. For example, a case may occur that cards are accommodated in the card accommodation part in a state that a front-rear direction of the card is inverted with respect to a correct direction of a card accommodated in the card accommodation part. In the card issue device described in Patent Literature 1, a card issue process is performed on the assumption that cards are accommodated in a correct direction in the card accommodation part. Therefore, in this card issue device, when an issue operation of a card accommodated in the card accommodation part in an incorrect direction is performed, for example, an abnormality such as a recording error of data occurs in the card reader during the card issue process.

In the card issue device described in Patent Literature 1, when an abnormality such as a recording error of data occurs in the card reader during a card issue process, for example, the card in which the abnormality has occurred is discarded to the card collection part and, after that, the card issue process is abnormally ended, or a reissue process of a card which uses a new card is performed. In other words, in the card issue device, a card having been accommodated in an incorrect direction in the card accommodation part cannot be issued.

SUMMARY

In view of the problem described above, at least an embodiment of the present invention provides a control method of a card issue device which is capable of issuing a card even when the card is accommodated in an incorrect direction in the card accommodation part. Further, at least an embodiment of the present invention provides a card issue device which is capable of issuing a card even when the card is accommodated in an incorrect direction in the card accommodation part.

To solve the above-mentioned problem, at least an embodiment of the present invention provides a control method of a card issue device including a card accommodation part in which a card before issue is accommodated and a card reader structured to perform at least one of reading of data recorded in the card and recording of data to the card. The control method of the card issue device includes a card direction determination step in which a determination process wherein the card is taken into the card reader before the card is issued and a direction of the card is determined is executed, and a card issue step in which an issue process of the card is executed based on a result of the determination process in the card direction determination step.

In the control method of the card issue device in accordance with at least an embodiment of the present invention, in the card direction determination step, a determination process wherein a card is taken into the card reader before the card is issued and a direction of the card is determined is executed and, in a card issue step after the card direction determination step, an issue process of the card is executed based on a result of the determination process in the card direction determination step. Therefore, according to at least an embodiment of the present invention, an appropriate issue process of a card can be performed depending on a direction of the card which is accommodated in the card accommodation part. Accordingly, in at least an embodiment of the present invention, even when a card is accommodated in an incorrect direction in the card accommodation part, the card can be issued.

In at least an embodiment of the present invention, for example, the card is a magnetic card which is formed with a magnetic stripe in which magnetic data are recorded, and the card reader includes a magnetic head which performs recording of magnetic data to the card and reading of magnetic data recorded to the card and, in the card direction determination step, recording and reading of magnetic data to and from the card are performed in the card reader and the direction of the card is determined based on a reading result of the magnetic data.

In at least an embodiment of the present invention, the card issue device includes a card inversion mechanism structured to invert front and back sides of the card, and the card direction determination step includes a first recording-reading step in which the card sent out from the card accommodation part is taken into the card reader to perform recording and reading of magnetic data to and from the card, a card inversion step in which, in a case that normal reading of the magnetic data has not been performed in the first recording-reading step, the card is ejected from the card reader and the front and back sides of the card are inverted by the card inversion mechanism, and a second recording-reading step in which the card is taken into the card reader after the card inversion step to perform recording and reading of magnetic data to and from the card. According to this structure, a front-back direction of the card can be determined. Therefore, even when a card is accommodated in the card accommodation part in a state that a front-back direction of the card is incorrect, an appropriate issue process of the card is performed and the card can be issued.

Further, in this case, the card issue device includes a first card reader and a second card reader as the card reader, a conveyance direction of the card conveyed in the first card reader and a conveyance direction of the card conveyed in the second card reader are parallel to each other and, when a direction perpendicular to the conveyance direction of the card and a thickness direction of the card conveyed is defined as a width direction of the card, the card to be issued is taken into the first card reader and the second card reader from one side in the conveyance direction of the card, the magnetic head of the first card reader is disposed on one side in the width direction of the card, and the magnetic head of the second card reader is disposed on the other side in the width direction of the card and, in the first recording-reading step and the second recording-reading step, the card is taken into the first card reader, and the card direction determination step includes a third recording-reading step in which, in a case that normal reading of magnetic data has not been performed in the second recording-reading step, the card ejected from the first card reader is taken into the second card reader to perform recording and reading of magnetic data to and from the card.

According to this structure, a front-rear direction of a card can be also determined. In other words, according to this structure, a front-back direction of a card and a front-rear direction of the card can be determined. Therefore, even when a card is accommodated in the card accommodation part in a state that a front-back direction of the card is incorrect and, even when a card is accommodated in the card accommodation part in a state that a front-rear direction of the card is incorrect, an appropriate issue process of the card is performed and the card can be issued.

In at least an embodiment of the present invention, the card direction determination step includes, for example, a second card inversion step in which, before the third recording-reading step, the card is ejected from the first card reader and the front and back sides of the card are inverted by the card inversion mechanism and, in a case that normal reading of magnetic data has not been performed in the second recording-reading step, the second card inversion step is executed and the third recording-reading step is executed after the second card inversion step.

In at least an embodiment of the present invention, the card direction determination step includes, in a case that normal reading of magnetic data has not been performed in the third recording-reading step, a third card inversion step in which the card is ejected from the second card reader and the front and back sides of the card are inverted by the card inversion mechanism, and a fourth recording-reading step in which the card is taken into the second card reader after the third card inversion step to perform recording and reading of magnetic data to and from the card. According to this structure, when a card sent out from the card accommodation part has some abnormality, normal reading of magnetic data is not performed also in the fourth recording-reading step. Therefore, based on a reading result of magnetic data in the fourth recording-reading step, it can be determined whether a card sent out from the card accommodation part has some abnormality or not.

In at least an embodiment of the present invention, it may be structured that the card issue device includes a first card reader and a second card reader as the card reader, a conveyance direction of the card conveyed in the first card reader and a conveyance direction of the card conveyed in the second card reader are parallel to each other and, when a direction perpendicular to the conveyance direction of the card and a thickness direction of the card conveyed is defined as a width direction of the card, the card to be issued is taken into the first card reader and the second card reader from one side in the conveyance direction of the card, the magnetic head of the first card reader is disposed on one side in the width direction of the card, and the magnetic head of the second card reader is disposed on an other side in the width direction of the card, and the card direction determination step includes a fifth recording-reading step in which the card sent out from the card accommodation part is taken into the first card reader to perform recording and reading of magnetic data to and from the card, and a sixth recording-reading step in which, in a case that normal reading of magnetic data has not been performed in the fifth recording-reading step, the card is ejected from the first card reader and is taken into the second card reader to perform recording and reading of magnetic data to and from the card. In this case, a front-rear direction of the card can be determined. Therefore, even when a card is accommodated in the card accommodation part in a state that a front-rear direction of the card is incorrect, an appropriate issue process of the card is performed and the card can be issued.

Further, in this case, the card issue device includes a card inversion mechanism structured to invert front and back sides of the card, and the card direction determination step includes a fourth card inversion step in which, in a case that normal reading of the magnetic data has not been performed in the sixth recording-reading step, the card is ejected from the second card reader and the front and back sides of the card are inverted by the card inversion mechanism, and a seventh recording-reading step in which the card is taken into the first card reader or the second card reader after the fourth card inversion step to perform recording and reading of magnetic data to and from the card.

According to this structure, a front-back direction of a card can be also determined. In other words, according to this structure, a front-rear direction of a card and a front-back direction of the card can be determined. Therefore, even when a card is accommodated in the card accommodation part in a state that a front-rear direction of the card is incorrect and, even when a card is accommodated in the card accommodation part in a state that a front-back direction of the card is incorrect, an appropriate issue process of the card is performed and the card can be issued.

In at least an embodiment of the present invention, the card issue device includes a printer structured to print an image on the card, and the card issue step includes a printing step in which the image is printed on the card by the printer and, in the printing step, a direction of the image to be printed on the card is determined based on the result of the determination process in the card direction determination step. According to this structure, even when a card is accommodated in the card accommodation part in a state that a front-rear direction of the card is incorrect, an appropriate image can be printed on the card by using a common printer.

In at least an embodiment of the present invention, it may be structured that the card is an IC card which is incorporated with an IC chip and is formed with an outside connection terminal of the IC chip, the card reader includes an IC contact block having a plurality of IC contact springs structured to contact with the outside connection terminal and, in the card direction determination step, activation processing of the card is performed in the card reader and the direction of the card is determined based on a result of the activation processing.

Further, in at least an embodiment of the present invention, it may be structured that the card is a magnetic card which is formed with a magnetic stripe in which magnetic data are recorded and an IC card which is incorporated with an IC chip and is formed with an outside connection terminal of the IC chip, and the card reader includes a magnetic head which performs recording of magnetic data to the card and reading of magnetic data recorded to the card, and an IC contact block having a plurality of IC contact springs structured to contact with the outside connection terminal and, in the card direction determination step, recording and reading of magnetic data to and from the card and activation processing of the card are performed in the card reader, and the direction of the card is determined based on a reading result of the magnetic data and a result of the activation processing.

In addition, in at least an embodiment of the present invention, it may be structured that the card reader includes a scanner structured to acquire an image of the card and, in the card direction determination step, the image of the card is acquired in the card reader and the direction of the card is determined based on an acquired image. In this case, a direction of a card can be determined by acquiring an image of the card only once.

Further, to solve the above-mentioned problem, at least an embodiment of the present invention provides a card issue device including a card accommodation part in which a card before issue is accommodated, and a card reader structured to perform at least one of reading of data recorded in the card and recording of data to the card, and a determination process in which the card is taken into the card reader before the card is issued and a direction of the card is determined is executed, and an issue process of the card is executed based on a result of the determination process.

The card issue device in accordance with at least an embodiment of the present invention executes a determination process in which a card is taken into the card reader before the card is issued and a direction of the card is determined and executes an issue process of the card based on a result of the determination process. Therefore, according to at least an embodiment of the present invention, an appropriate issue process of a card can be performed depending on a direction of the card which is accommodated in the card accommodation part. Accordingly, in at least an embodiment of the present invention, even when a card is accommodated in an incorrect direction in the card accommodation part, the card can be issued.

As described above, in at least an embodiment of the present invention, even when a card is accommodated in an incorrect direction in the card accommodation part, the card can be issued.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a list of cards which are capable of being issued in the card issue device shown in FIG. 1.

FIGS. 8A through FIG. 8D are views for explaining a direction of a card which is accommodated in the card accommodation part shown in FIG. 1.

DETAILED DESCRIPTION

An embodiment of the present invention will be described below with reference to the accompanying drawings.

Structure of Card Issue Device

Figure 1:
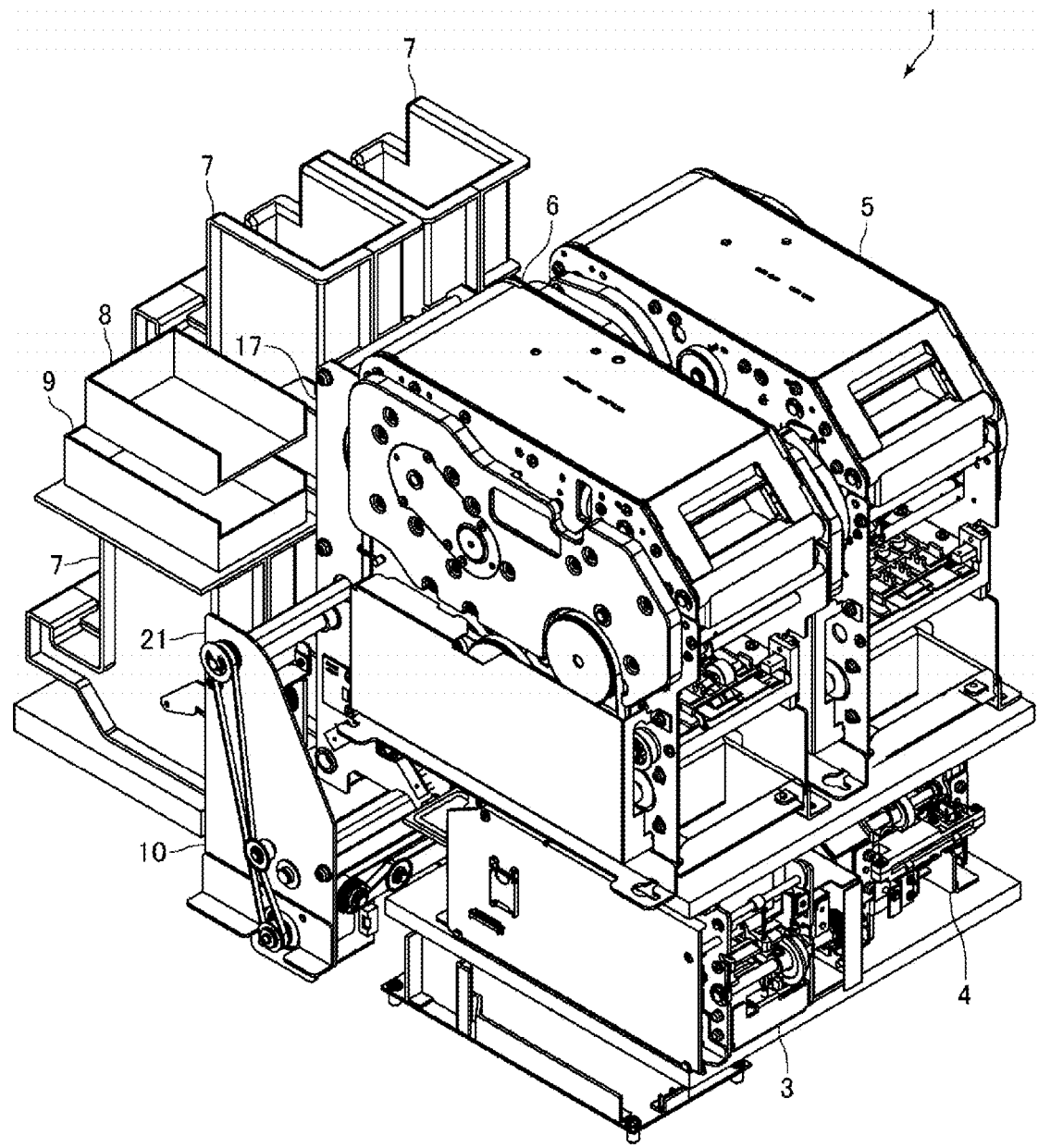
FIG. 1 is a perspective view showing a card issue device in accordance with an embodiment of the present invention.
Figure 1:
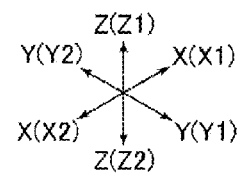
Figure 2:
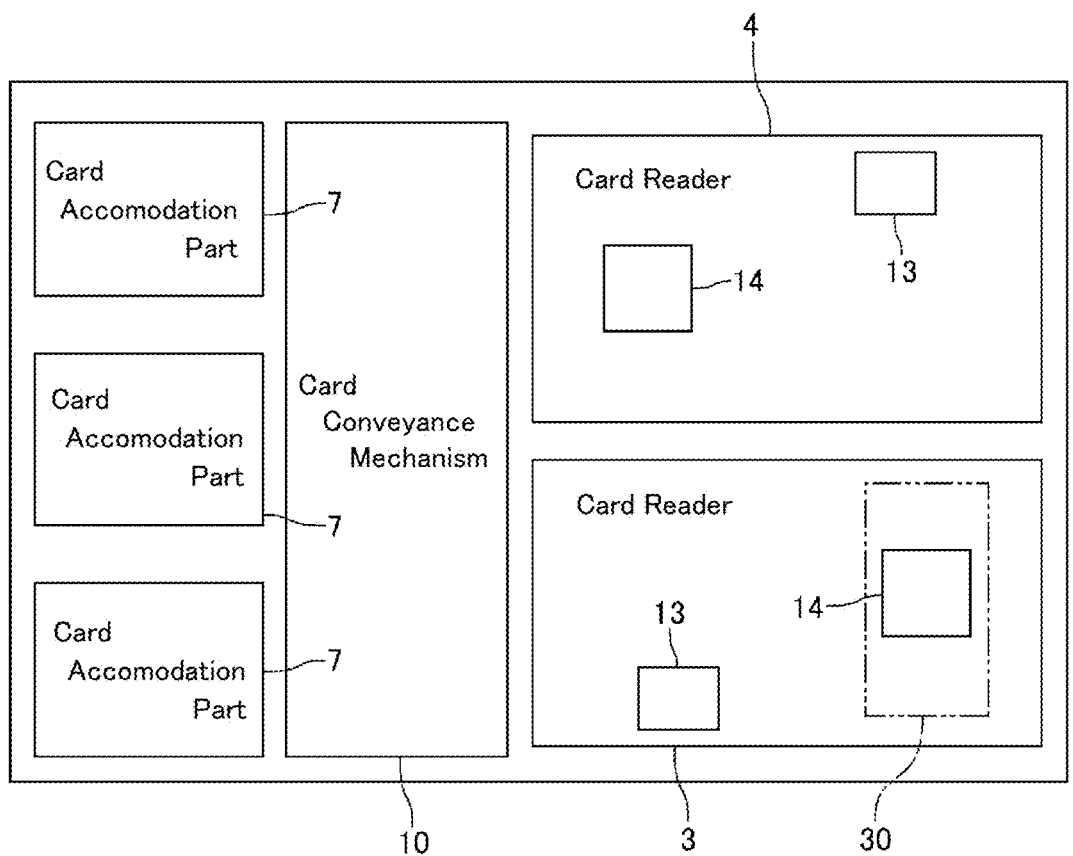
FIG. 2 is an explanatory view showing a structure of a first floor portion of the card issue device shown in FIG. 1.
Figure 2:
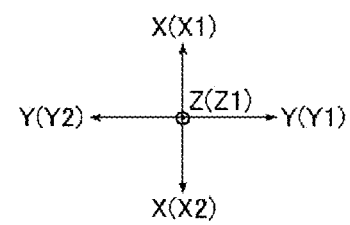
Figure 3A:
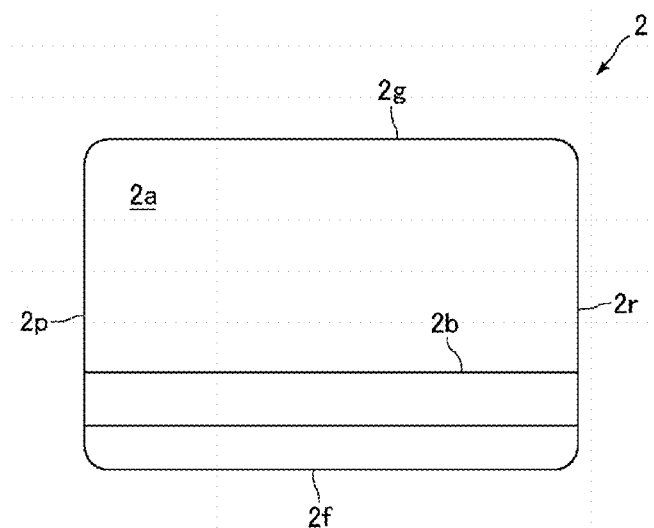
FIG. 3A and FIG. 3B are explanatory views showing a card which is issued in the card issue device shown in FIG. 1.
Figure 3B:
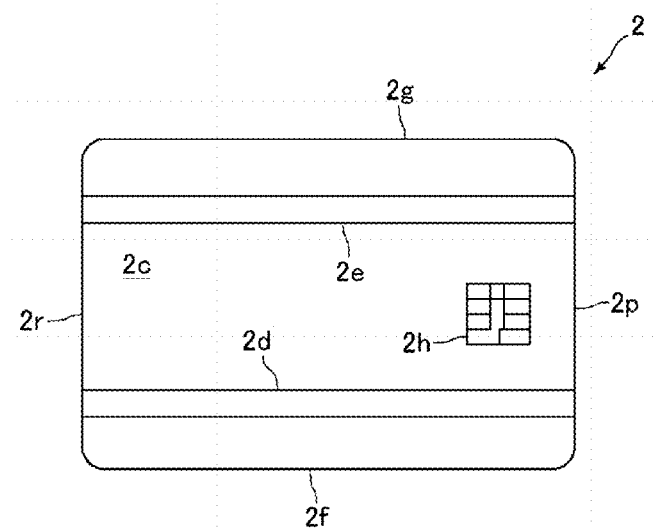
Figure 4A:
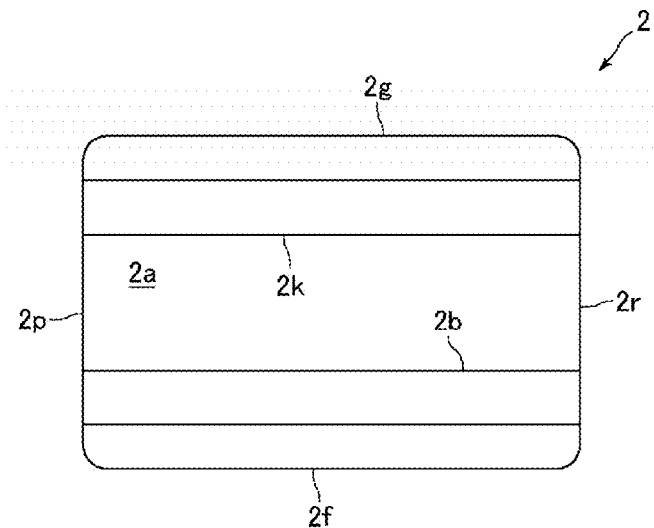
FIG. 4A and FIG. 4B are explanatory views showing a card capable of being issued in the card issue device shown in FIG. 1.
Figure 4B:
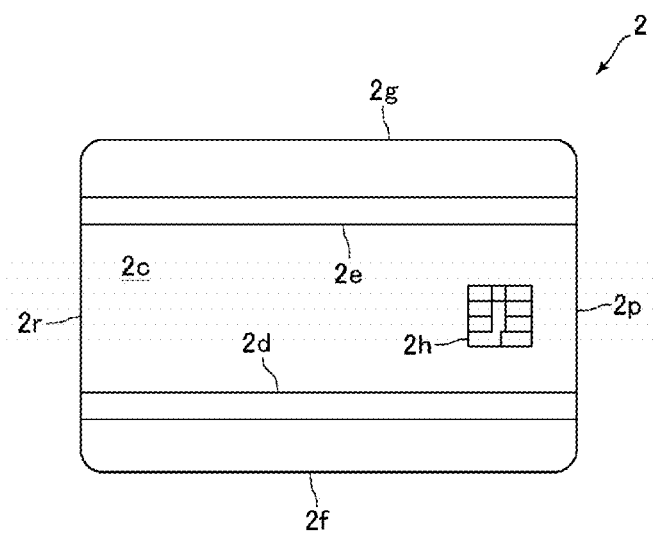
Figure 6:
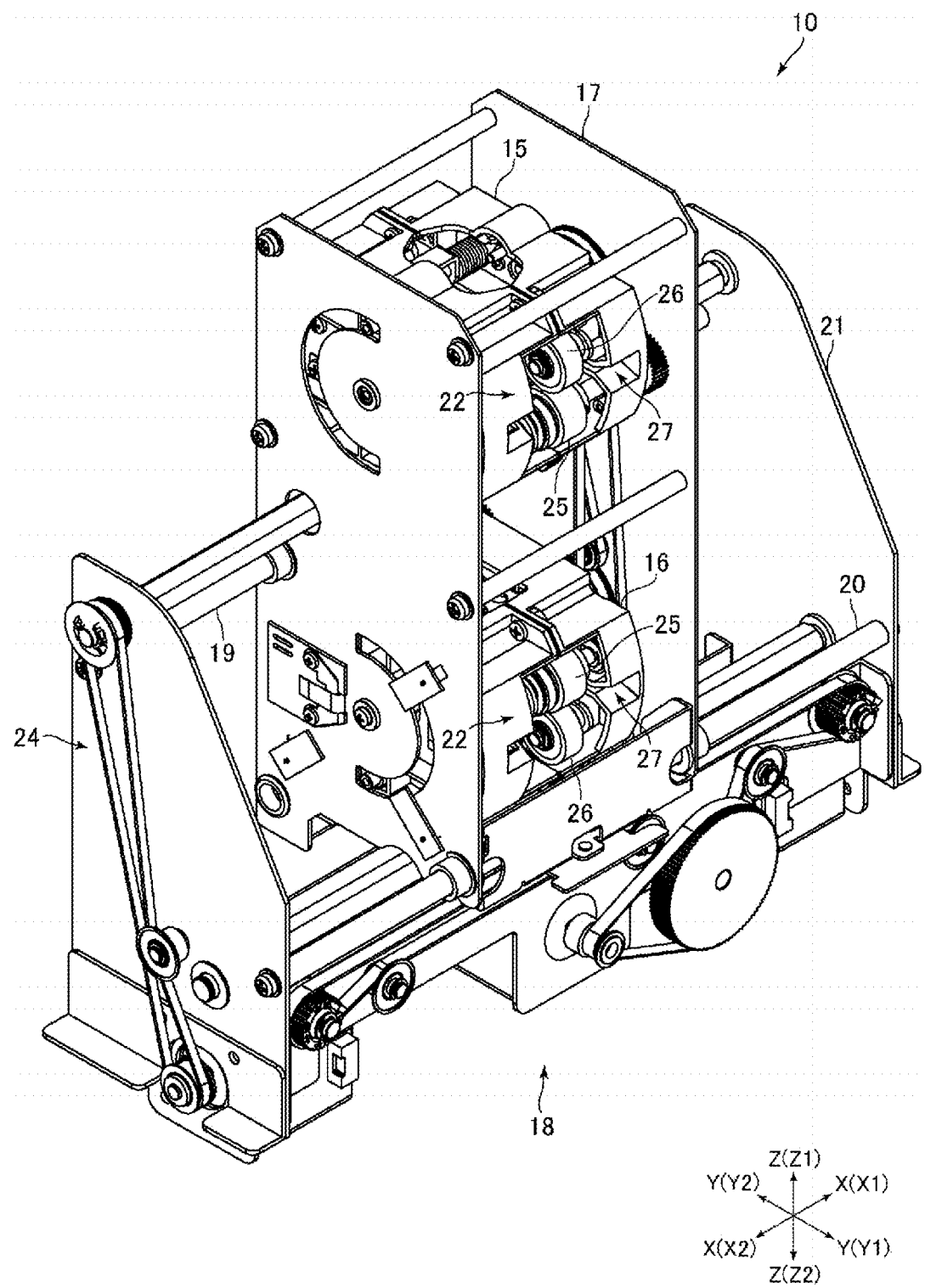
FIG. 6 is a perspective view showing a card inversion mechanism in FIG. 1.

FIG. 1 is a perspective view showing a card issue device 1 in accordance with an embodiment of the present invention. FIG. 2 is an explanatory view showing a structure of a first floor portion of the card issue device 1 shown in FIG. 1. FIG. 3A and FIG. 3B are explanatory views showing a card 2 which is issued in the card issue device 1 shown in FIG. 1. FIG. 4A and FIG. 4B are explanatory views showing a card 2 which is capable of being issued in the card issue device 1 shown in FIG. 1. FIG. 5 is a list of cards 2 which are capable of being issued in the card issue device 1 shown in FIG. 1. FIG. 6 is a perspective view showing a card conveyance mechanism 10 shown in FIG. 1.

A card issue device 1 in this embodiment includes two card readers 3 and 4 structured to perform reading of data recorded in a card 2 and recording of data to the card 2, a printer 5 structured to print an image on a card 2, a labeling machine (labeler) 6 structured to stick a label (seal) on a card 2, five card accommodation parts 7 in which cards 2 before issue are accommodated, a card taking-out part 8 for taking out a card 2 to be issued, a card collection part 9 to which an unnecessary card 2 is collected, and a card conveyance mechanism 10 structured to convey a card 2 between these structures. In this embodiment, the card issue device 1 may be provided with no labeler 6.

In the following descriptions, three directions perpendicular to each other are defined as an "X" direction, a "Y" direction and a "Z" direction. In this embodiment, the "Z" direction is coincided with the vertical direction and thus the "Z" direction is set in an upper and lower direction. Further, the "X" direction is referred to as a right and left direction, the "Y" direction is referred to as a front and rear direction, and the "X1" direction side in the right and left direction is a "right" side, the "X2" direction side which is the opposite side is a "left" side, the "Y1" direction side in the front and rear direction is a "front" side, the "Y2" direction side which is the opposite side is a "rear" side, the "Z1" direction side in the upper and lower direction is an "upper" side, and the "Z2" direction side which is the opposite side is a "lower" side.

The card readers 3 and 4, the printer 5 and the labeler 6 are disposed on a front end side of the card issue device 1. The card accommodation parts 7, the card taking-out part 8 and the card collection part 9 are disposed on a rear end side of the card issue device 1. The card conveyance mechanism 10 is disposed at an intermediate position in the front and rear direction of the card issue device 1 and is disposed between the card readers 3 and 4, the printer 5 and the labeler 6, and the five card accommodation parts 7, the card taking-out part 8 and the card collection part 9 in the front and rear direction.

The two card readers 3 and 4 are disposed so as to be adjacent to each other in the right and left direction. The printer 5 and the labeler 6 are disposed so as to be adjacent to each other in the right and left direction. Further, the printer 5 and the labeler 6 are disposed on an upper side with respect to the card readers 3 and 4. Three card accommodation parts 7 of the five card accommodation parts 7 are disposed so as to be adjacent to each other in the right and left direction. The card taking-out part 8 and the card collection part 9 are disposed so as to overlap with each other in the upper and lower direction, and the remaining two card accommodation parts 7 and the card taking-out part 8 and the card collection part 9 are disposed so as to be adjacent to each other in the right and left direction. The two card accommodation parts 7, the card taking-out part 8 and the card collection part 9 are disposed on an upper side with respect to the three card accommodation parts 7 adjacently disposed in the right and left direction.

In other words, the card issue device 1 in this embodiment has a so-called two-storied structure, and a first floor portion of the card issue device 1 is structured of the card readers 3 and 4 and three card accommodation parts 7 (see FIG. 2). Further, a second floor portion of the card issue device 1 is structured of the printer 5, the labeler 6, two card accommodation parts 7, the card taking-out part 8 and the card collection part 9. In this embodiment, the card issue device 1 may be structured in a one-storied structure.

A card 2 is a substantially rectangular-shaped card made of vinyl chloride whose thickness is about 0.7-0.8 mm. As shown in FIG. 3A and FIG. 3B, a rear face 2a of the card 2 is formed with a magnetic stripe 2b in which magnetic data are recorded. A front face 2c of the card 2 is formed with a magnetic stripe 2d in which magnetic data are recorded. The magnetic stripes 2b and 2d are magnetic stripes specified by JIS standard "JISX6302-2". When viewed in a thickness direction of the card 2, the magnetic stripe 2b and the magnetic stripe 2d are overlapped with each other.

Further, the front face 2c of the card 2 is formed with a magnetic stripe 2e in which magnetic data are recorded. The magnetic stripe 2e is formed in parallel with the magnetic stripe 2d. A width of the magnetic stripe 2e (width in a shorter direction of the card 2) is set to be equal to a width of the magnetic stripe 2d (width in the shorter direction of the card 2). A distance between one end face 2f in the shorter direction of the card 2 formed in a substantially rectangular shape and the magnetic stripe 2d and a distance between the other end face 2g in the shorter direction of the card 2 and the magnetic stripe 2e are set to be equal to each other. Further, an IC chip (not shown) is incorporated in the card 2. The front face 2c of the card 2 is formed with an outside connection terminal 2h of the IC chip.

As described above, a card 2 which is to be issued in the card issue device 1 in this embodiment is a magnetic card which is formed with magnetic stripes 2b, 2d and 2e in which magnetic data are recorded. Further, the card 2 which is to be issued in the card issue device 1 is also a contact type IC card which is incorporated with an IC chip and formed with an outside connection terminal 2h.

In this embodiment, the card issue device 1 is also capable of issuing a card 2 formed with a magnetic stripe 2k in which magnetic data are recorded on the rear face 2a of the card 2 as shown in FIG. 4A. The magnetic stripe 2k is formed in parallel with the magnetic stripe 2b. A width of the magnetic stripe 2k (width in a shorter direction of the card 2) is set to be equal to the width of the magnetic stripe 2b (width in the shorter direction of the card 2). Further, a distance between the one end face 2f in the shorter direction of the card 2 and the magnetic stripe 2b and a distance between the other end face 2g in the shorter direction of the card 2 and the magnetic stripe 2k are set to be equal to each other.

Further, in the card issue device 1, a card 2 which is not formed with magnetic stripes 2b, 2d, 2e and 2k is also capable of being issued. In addition, in the card issue device 1, a card 2 formed with one, two or three magnetic stripes which are arbitrarily selected from the magnetic stripes 2b, 2d, 2e and 2k can be also issued. When cards 2 which are capable of being issued in the card issue device 1 are collectively listed, a list shown in FIG. 5 is obtained. In other words, in the card issue device 1, the 16 types of card 2 of No. 1 through No. 16 in FIG. 5 can be issued.

In FIG. 5, the "JIS2-1" corresponds to the magnetic stripe 2d, the "ISO-1" corresponds to the magnetic stripe 2b, the "JIS2-2" corresponds to the magnetic stripe 2e, and the "ISO-2" corresponds to the magnetic stripe 2k. Further, in FIG. 5, the magnetic stripe with the "O" mark is formed in a card 2, and the magnetic stripe with the "x" mark is not formed in a card 2. A card 2 which is issued in the card issue device 1 in this embodiment is the card 2 of No. 8 in the list in FIG. 5.

Insides of the card readers 3 and 4 are respectively formed with a card conveyance passage where a card 2 is conveyed. The card readers 3 and 4 respectively include a magnetic head 13 structured to perform recording of magnetic data to a card 2 and reading of magnetic data recorded on the card 2. The card readers 3 and 4 in this embodiment respectively include two magnetic heads 13 which are disposed so as to face each other in the upper and lower direction. One of the two magnetic heads 13 is disposed so as to face the card conveyance passage from an upper side, and the other magnetic head 13 is disposed so as to face the card conveyance passage from a lower side. The two magnetic heads 13 are disposed at positions in the right and left direction where the magnetic stripes 2b and 2d or the magnetic stripe 2e of a card 2 is passed. Further, the card readers 3 and 4 respectively include an IC contact block 14 having a plurality of IC contact springs (not shown) structured to contact with an outside connection terminal 2h of a card 2. The card reader 3 in this embodiment is a first card reader and the card reader 4 is a second card reader.

Further, the card readers 3 and 4 respectively include a conveyance mechanism for a card 2. In the card readers 3 and 4, a card 2 is conveyed in the front and rear direction. In other words, a conveyance direction of a card 2 conveyed in the card reader 3 and a conveyance direction of a card 2 conveyed in the card reader 4 are parallel to each other. In this embodiment, a card 2 which is to be issued is taken into the card readers 3 and 4 from a rear side of the card readers 3 and 4 and is ejected from the card readers 3 and 4 to the rear side. Further, in the card readers 3 and 4, a card 2 is conveyed in a state that a longitudinal direction of the card 2 and the front and rear direction are coincided with each other and, in addition, that a shorter direction of the card 2 and the right and left direction are coincided with each other. The front and rear direction ("Y" direction) in this embodiment is a conveyance direction of a card 2, and the upper and lower direction ("Z" direction) is a thickness direction of the card 2 being conveyed. Further, the right and left direction ("X" direction) is a width direction (short width direction) of a card 2.

The card reader 3 and the card reader 4 are similarly structured to each other. In other words, the card reader 3 and the card reader 4 are structured so that the same components are similarly disposed. The card reader 3 and the card reader 4 which are structured similarly are disposed so that their directions in the front and rear direction are inverted each other. In other words, when viewed in the upper and lower direction, the card reader 3 and the card reader 4 are disposed point symmetrically with respect to a midpoint of a virtual line connecting a center of the card reader 3 with a center of the card reader 4.

Therefore, as shown in FIG. 2, in the card reader 3, the two magnetic heads 13 are disposed on a left rear end side of the card reader 3 and, in the card reader 4, the two magnetic heads 13 are disposed on a right front end side of the card reader 4. In other words, the magnetic heads 13 of the card reader 3 are disposed on one side in the right and left direction which is a width direction of a card 2, and the magnetic heads 13 of the card reader 4 are disposed on the other side in the right and left direction. Further, in the card reader 3, the IC contact block 14 is disposed on the front end side of the card reader 3 and, in the card reader 4, the IC contact block 14 is disposed on the rear end side of the card reader 4.

In this embodiment, normally, reading of magnetic data recorded in the magnetic stripes 2b and 2d and recording of magnetic data to the magnetic stripes 2b and 2d are performed by the two magnetic heads 13 of the card reader 3, and reading of magnetic data recorded in the magnetic stripe 2e and recording of magnetic data to the magnetic stripe 2e are performed by one of the two magnetic heads 13 of the card reader 4. Further, normally, data communication is performed between the card reader 3 and a card 2 by using the IC contact block 14 of the card reader 3.

However, as described below, depending on a direction of a card 2 accommodated in the card accommodation part 7, it may be also occurred that reading of magnetic data recorded in the magnetic stripes 2b and 2d and recording of magnetic data to the magnetic stripes 2b and 2d are performed by the two magnetic heads 13 of the card reader 4, and reading of magnetic data recorded in the magnetic stripe 2e and recording of magnetic data to the magnetic stripe 2e are performed by one of the two magnetic heads 13 of the card reader 3. Further, depending on a direction of a card 2 accommodated in the card accommodation part 7, communication of data may also be performed between the card reader 4 and a card 2 by the IC contact block 14 of the card reader 4.

An inside of the printer 5 is formed with a card conveyance passage. Further, the printer 5 includes a conveyance mechanism for a card 2. In the printer 5, a card 2 is conveyed in the front and rear direction. In this embodiment, a card 2 which is to be issued is taken into the printer 5 from a rear side of the printer 5 and is ejected from the printer 5 to the rear side. Further, in the printer 5, a card 2 is conveyed in a state that a longitudinal direction of the card 2 and the front and rear direction are coincided with each other and that a shorter direction of the card 2 and the right and left direction are coincided with each other.

An inside of the labeler 6 is formed with a card conveyance passage. Further, the labeler 6 includes a conveyance mechanism for a card 2. In the labeler 6, a card 2 is conveyed in the front and rear direction. In this embodiment, a card 2 which is to be issued is taken into the labeler 6 from a rear side of the labeler 6 and is ejected from the labeler 6 to the rear side. Further, in the labeler 6, a card 2 is conveyed in a state that a longitudinal direction of the card 2 and the front and rear direction are coincided with each other and that a shorter direction of the card 2 and the right and left direction are coincided with each other.

The card taking-out part 8 and the card collection part 9 are respectively formed in a box shape whose upper face is opened. The card accommodation part 7 includes an accommodation box in which a plurality of cards 2 before issue is laminated and accommodated and a sending-out mechanism for a card 2 which is disposed on a lower side of the accommodation box. The accommodation box is formed in a box shape whose upper end and rear end side are opened. Cards 2 are accommodated in the accommodation box so that a longitudinal direction of a card 2 and the front and rear direction are coincided with each other and, in addition, a shorter direction of the card 2 and the right and left direction are coincided with each other. The sending-out mechanism includes, for example, a sending-out claw structured to abut with a rear end of the lowest card 2 in an inside of the accommodation box to send out the card 2 and a drive mechanism for the sending-out claw, and the cards 2 accommodated in the accommodation box are sent out toward the front side one by one. A lower end side of a front side face of the accommodation box is formed with a sending-out hole through which a card 2 sent out by the sending-out mechanism is passed.

The card conveyance mechanism 10 includes two card holding parts 15 and 16 in which a card 2 is temporarily held in its inside, a carriage 17 on which the card holding parts 15 and 16 are mounted, a carriage moving mechanism 18 structured to linearly move the carriage 17 in the right and left direction, two guide shafts 19 and 20 which guide the carriage 17 in the right and left direction, a support frame 21 which supports both respective end sides of the guide shafts 19 and 20, and a turning mechanism 24 structured to turn the card holding parts 15 and 16 with respect to the carriage 17.

The card holding part 15 and the card holding part 16 are disposed so as to overlap with each other in the upper and lower direction. The card holding parts 15 and 16 are turnably held by the carriage 17. Specifically, the card holding parts 15 and 16 are held by the carriage 17 so as to be capable of turning with the right and left direction as an axial direction of the turning. The card holding parts 15 and 16 respectively include a leading-in and sending-out mechanism 22 structured to lead a card 2 in and send the card 2 out. An inside of each of the card holding parts 15 and 16 is formed with a card conveyance passage 27 in a straight line shape where a card 2 led in and sent out by the leading-in and sending-out mechanism 22 is conveyed.

The leading-in and sending-out mechanism 22 includes a drive roller 25, a pad roller 26 disposed so as to face the drive roller 25, a motor for rotating the drive roller 25, and a power transmission mechanism structured to transmit power of the motor to the drive roller 25. The leading-in and sending-out mechanism 22 leads a card 2 into the card conveyance passage 27 and sends the card 2 out from the card conveyance passage 27 so that a leading-in direction and a sending-out direction of the card 2 and a longitudinal direction of the card 2 are coincided with each other. Further, a shorter direction of the card 2 led into the card conveyance passage 27 is coincided with the right and left direction.

The guide shafts 19 and 20 are fixed to the support frame 21 so that the axial directions of the guide shafts 19 and 20 and the right and left direction are coincided with each other. The carriage 17 is supported by the guide shafts 19 and 20 so as to be capable of sliding in the right and left direction. The carriage moving mechanism 18 includes a motor which is a drive source and a power transmission mechanism structured to transmit power of the motor to the carriage 17. When the motor of the carriage moving mechanism 18 is rotated, the carriage 17 is guided by the guide shafts 19 and 20 and is moved in the right and left direction.

The turning mechanism 24 includes a motor which is a drive source and a power transmission mechanism structured to transmit power of the motor to the card holding parts 15 and 16. When the motor of the turning mechanism 24 is rotated, the card holding part 15 and the card holding part 16 are turned together in the same direction. Further, the card holding parts 15 and 16 are turned with the right and left direction as an axial direction of turning. The card holding parts 15 and 16 in this embodiment are turnable by 180° with the right and left direction as an axial direction of turning from a state that the card conveyance passage 27 of the card holding part 15 is parallel to a horizontal direction and, in addition, that the card conveyance passage 27 of the card holding part 16 is parallel to the horizontal direction, to a state that the card conveyance passages 27 of the card holding parts 15 and 16 are inverted vertically.

Therefore, in this embodiment, front and back sides of a card 2 which is held in each of the card holding parts 15 and 16 can be inverted. Specifically, a card 2 which is held in each of the card holding parts 15 and 16 is capable of being turned with a shorter direction of the card 2 as an axial direction of turning and the front and back sides of the card 2 are inverted. The card conveyance mechanism 10 in this embodiment is a card inversion mechanism structured to invert the front and back sides of a card 2. Further, in this embodiment, when the card holding parts 15 and 16 are turned to middle positions of turning ranges of the card holding parts 15 and 16 (in other words, when the card holding parts 15 and 16 are turned by 90° from a state that the card conveyance passage 27 is parallel to the horizontal direction), a card 2 can be directly transferred between the card holding part 15 and the card holding part 16 in the upper and lower direction.

Further, in this embodiment, in a state that the card conveyance passage 27 is parallel to the horizontal direction, the heights of the card conveyance passages of the card readers 3 and 4 and the height of the card conveyance passage 27 of the card holding part 16 are coincided with each other in the upper and lower direction, and the height of the card conveyance passage of the printer 5, the height of the card conveyance passage of the labeler 6 and the height of the card conveyance passage 27 of the card holding part 15 are coincided with each other. Therefore, in a state that the card conveyance passage 27 is parallel to the horizontal direction, a card 2 can be conveyed between the card readers 3 and 4 and the card holding part 16, and a card 2 can be conveyed between each of the printer 5 and the labeler 6 and the card holding part 15.

Further, in a state that the card conveyance passage 27 is parallel to the horizontal direction, in the upper and lower direction, a height of the card conveyance passage 27 of the card holding part 15 and heights of the sending-out holes for a card 2 of the two card accommodation parts 7 disposed on an upper side are coincided with each other, and a height of the card conveyance passage 27 of the card holding part 16 and heights of the sending-out holes for a card 2 of the three card accommodation parts 7 disposed on a lower side are coincided with each other. Therefore, in a state that the card conveyance passage 27 is parallel to the horizontal direction, a card 2 which is sent out from the card accommodation part 7 is capable of being led into the card holding part 15 or 16. In this embodiment, in the state that the card conveyance passage 27 is parallel to the horizontal direction, the card conveyance passage 27 of the card holding part 15 is disposed on a slightly upper side with respect to the bottom face of the card taking-out part 8.

When a card 2 is accommodated in the card accommodation part 7 in a correct direction, a front face 2c of the card 2 faces an upper side, the one end face 2p in a longitudinal direction of the card 2 is disposed on a front side, and the other end face 2r in the longitudinal direction of the card 2 is disposed on a rear side (see FIG. 8A). In this embodiment, when a card 2 accommodated in the card accommodation part 7 in a correct direction is taken into the card readers 3 and 4 as it is, in the card reader 3, normal recording of magnetic data to the magnetic stripes 2b and 2d and normal reading of magnetic data recorded in the magnetic stripes 2b and 2d are capable of being performed by the two magnetic heads 13 and, in the card reader 4, normal recording of magnetic data to the magnetic stripe 2e and normal reading of magnetic data recorded in the magnetic stripe 2e are capable of being performed by the magnetic head 13.

In other words, when a card 2 in which a front face 2c of the card 2 faces an upper side and the one end face 2p in a longitudinal direction of the card 2 is disposed on a front side is taken into the card readers 3 and 4, in the card reader 3, normal recording of magnetic data to the magnetic stripes 2b and 2d and normal reading of magnetic data recorded in the magnetic stripes 2b and 2d are capable of being performed by the two magnetic heads 13 and, in the card reader 4, normal recording of magnetic data to the magnetic stripe 2e and normal reading of magnetic data recorded in the magnetic stripe 2e are capable of being performed by the magnetic head 13. Further, when a card 2 in which a front face 2c of the card 2 faces an upper side and the one end face 2p in a longitudinal direction of the card 2 is disposed on a front side is taken into the card reader 3, in the card reader 3, normal data communication of the card reader 3 with the card 2 can be performed by using the IC contact block 14.

However, in a case that a card 2 (see FIG. 8C) in which a front face 2c of the card 2 faces an upper side and the other end face 2r in a longitudinal direction of the card 2 is disposed on a front side is taken into the card readers 3 and 4, in the card reader 4, normal recording of magnetic data to the magnetic stripes 2b and 2d and normal reading of magnetic data recorded in the magnetic stripes 2b and 2d are capable of being performed by the two magnetic heads 13 and, in the card reader 3, normal recording of magnetic data to the magnetic stripe 2e and normal reading of magnetic data recorded in the magnetic stripe 2e are capable of being performed by the magnetic head 13. Further, also in a case that a card 2 in which a front face 2c of the card 2 faces an upper side and the other end face 2r in a longitudinal direction of the card 2 is disposed on a front side is taken into the card reader 4, in the card reader 4, normal data communication of the card reader 4 with the card 2 can be performed by using the IC contact block 14.

Operation of Card Issue Device

Figure 7:
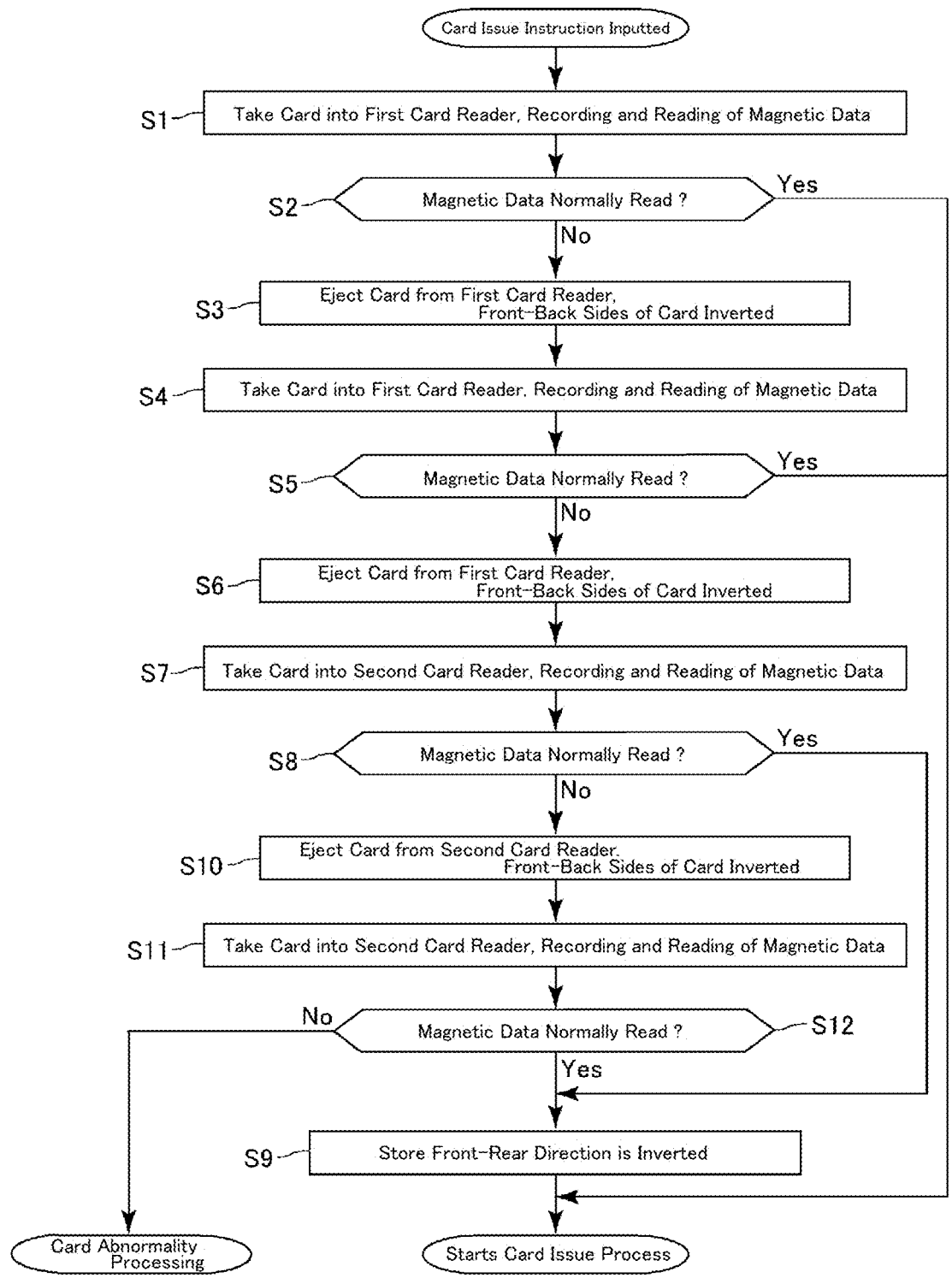
FIG. 7 is a flow chart for explaining a part of operation of the card issue device shown in FIG. 1.

FIG. 7 is a flow chart for explaining a part of operation of the card issue device 1 shown in FIG. 1. FIG. 8A through FIG. 8D are views for explaining a direction of a card which is accommodated in the card accommodation part 7 shown in FIG. 1. In FIG. 8A through FIG. 8D, an outside connection terminal 2h is not shown.

When an issue instruction of a card 2 is inputted into the card issue device 1 from a host apparatus such as a personal computer with which the card issue device 1 is connected, the card issue device 1 takes a card 2 into the card reader 3 or 4 before the card 2 is issued and executes a determination process for determining a direction of the card 2 and, based on a result of the determination process, an issue process of the card 2 is executed. Specifically, as shown in FIG. 7, when an issue instruction of a card 2 is inputted into the card issue device 1, first, the card issue device 1 takes a card 2 sent out from the card accommodation part 7 into the card reader 3 which is a first card reader to perform recording and reading of magnetic data to and from the card 2 (step S1).

In the step S1, the card 2 sent out from the card accommodation part 7 is conveyed to the card reader 3 by the card conveyance mechanism 10, and the conveyed card 2 is taken into the card reader 3. A direction of the card 2 which is taken into the card reader 3 is coincided with a direction of the card 2 when the card 2 has been accommodated in the card accommodation part 7. Further, in the step S1, the card reader 3 performs recording and reading of magnetic data to and from the card 2 by the two magnetic heads 13 of the card reader 3 while conveying the card 2. Specifically, the card reader 3 performs recording of magnetic data to a card 2 by the two magnetic heads 13 and then, reading of magnetic data is performed. After that, the card issue device 1 determines whether normal reading of magnetic data has been performed in the step S1 by the two magnetic heads 13 or not (step S2).

As described above, when a card 2 accommodated in a correct direction in the card accommodation part 7 is taken into the card reader 3 as it is, in the card reader 3, normal recording of magnetic data to the card 2 and normal reading of magnetic data recorded on the card 2 can be performed by the two magnetic heads 13. Therefore, in a case that a card 2 sent out from the card accommodation part 7 is accommodated in a correct direction in the card accommodation part 7 (when a card 2 is accommodated in the card accommodation part 7 in a direction shown in FIG. 8A), in the step S1, appropriate magnetic data can be recorded in the magnetic stripes 2b and 2d and, as a result, normal reading of magnetic data can be performed.

Further, as described above, when a card 2 accommodated in the card accommodation part 7 in a correct direction is taken into the card reader 3 or 4 in the direction as it is, in the card reader 3, normal recording of magnetic data to the magnetic stripes 2b and 2d and normal reading of magnetic data recorded in the magnetic stripes 2b and 2d can be performed by the two magnetic heads 13 and, in the card reader 4, normal recording of magnetic data to the magnetic stripe 2e and normal reading of magnetic data recorded in the magnetic stripe 2e can be performed by the magnetic head 13. In addition, in the card reader 3, normal data communication of the card reader 3 with the card 2 can be performed by using the IC contact block 14.

Therefore, in the step S2, when it is determined that normal reading of magnetic data has been performed by the two magnetic heads 13 (in other words, in the case of "Yes" in the step S2), the card issue device 1 erases magnetic data recorded in the card 2 in the step S1 and then, an issue process of the card 2 is started.

On the other hand, in a case that a card 2 sent out from the card accommodation part 7 is accommodated in the card accommodation part 7 in a state that, as shown in FIG. 8B, a front-back direction and a front-rear direction of the card 2 are inverted with respect to a correct direction of the card 2 accommodated in the card accommodation part 7 (state that a front-back direction of the card 2 is inverted and the other end face 2r of the card 2 is disposed on a front side) and, in a case that a card 2 sent out from the card accommodation part 7 is accommodated in the card accommodation part 7 in a state that, as shown in FIG. 8D, its front-back direction and its right-left direction are inverted with respect to a correct direction of the card 2 accommodated in the card accommodation part 7 (state that a front-back direction of the card 2 is inverted and the one end face 2p of the card 2 is disposed on a front side), both of two magnetic heads 13 of the card reader 3 are unable to perform appropriate recording of magnetic data in the step S1 and, as a result, normal reading of magnetic data is unable to be performed.

Further, in a case that a card 2 sent out from the card accommodation part 7 is accommodated in the card accommodation part 7 in a state that, as shown in FIG. 8C, its front-rear direction and its right-left direction are inverted with respect to a correct direction of the card 2 accommodated in the card accommodation part 7, in the step S1, one of the two magnetic heads 13 of the card reader 3 is unable to perform appropriate recording of magnetic data and, as a result, normal reading of magnetic data is not performed.

In other words, when a card 2 sent out from the card accommodation part 7 is accommodated in the card accommodation part 7 in one of the directions shown in FIG. 8B through FIG. 8D (in other words, when a card 2 is not accommodated in the card accommodation part 7 in a correct direction), in the step S1, normal reading of magnetic data is unable to be performed by at least one magnetic head 13.

Therefore, in the step S2, when it is determined that normal reading of magnetic data has not been performed by at least one magnetic head 13 (in other words, in the case of "No" in the step S2), the card issue device 1 ejects the card 2 from the card reader 3 and inverts front and back sides of the card 2 by using the card conveyance mechanism 10 (step S3). Specifically, in the step S3, the card issue device 1 turns the card 2 with a shorter direction of the card 2 as an axial direction of turning to invert the front and back sides of the card 2.

After that, the card issue device 1 takes the card 2 whose front and back sides have been inverted into the card reader 3 again and recording and reading of magnetic data are performed on the card 2 (step S4). In the step S4, the card reader 3 performs recording of magnetic data to the card 2 by the two magnetic heads 13 of the card reader 3 while conveying the card 2 and then, reading of magnetic data is performed. After that, the card issue device 1 determines whether normal reading of magnetic data has been performed by the two magnetic heads 13 in the step S4 or not (step S5).

When a card 2 sent out from the card accommodation part 7 is accommodated in the card accommodation part 7 in a direction shown in FIG. 8B, in the step S4, the card 2 is taken into the card reader 3 in a direction shown in FIG. 8A. Further, when a card 2 is taken into the card readers 3 and 4 in a direction shown in FIG. 8A, in the card reader 3, normal recording of magnetic data to the magnetic stripes 2b and 2d and normal reading of magnetic data recorded in the magnetic stripes 2b and 2d are capable of being performed by the two magnetic heads 13 and, in the card reader 4, normal recording of magnetic data to the magnetic stripe 2e and normal reading of magnetic data recorded in the magnetic stripe 2e can be performed by the magnetic head 13 and, in the card reader 3, normal data communication of the card reader 3 with the card 2 can be performed by using the IC contact block 14.

Therefore, in the step S5, when it is determined that normal reading of magnetic data has been performed by the two magnetic heads 13 (in other words, in the case of "Yes" in the step S5), the card issue device 1 erases magnetic data recorded in the card 2 in the step S5 and then, an issue process of the card 2 is started.

On the other hand, in the step S5, when it is determined that normal reading of magnetic data has not been performed by at least one magnetic head 13 (in other words, in the case of "No" in the step S5), the card issue device 1 ejects the card 2 from the card reader 3 and inverts front and back sides of the card 2 by using the card conveyance mechanism 10 (step S6). Specifically, in the step S6, the card issue device 1 turns the card 2 with a shorter direction of the card 2 as an axial direction of turning to invert the front and back sides of the card 2.

After that, the card issue device 1 takes the card 2 whose front and back sides have been inverted into the card reader 4 which is a second card reader, and recording and reading of magnetic data are performed on the card 2 (step S7). In the step S7, the card conveyance mechanism 10 conveys the card 2 to the card reader 4, and the conveyed card 2 is taken into the card reader 4. Further, in the step S7, the card reader 4 performs recording of magnetic data to the card 2 by the two magnetic heads 13 of the card reader 4 while conveying the card 2 and then, reading of magnetic data is performed.

After that, the card issue device 1 determines whether normal reading of magnetic data has been performed by the two magnetic heads 13 in the step S7 or not (step S8). When a card 2 sent out from the card accommodation part 7 is accommodated in the card accommodation part 7 in a direction shown in FIG. 8C, in the step S7, the card 2 is taken into the card reader 4 in a direction shown in FIG. 8C. Further, when a card 2 is taken into the card reader 4 in a direction shown in FIG. 8C, as described above, in the card reader 4, normal recording of magnetic data to the magnetic stripes 2b and 2d and normal reading of magnetic data recorded in the magnetic stripes 2b and 2d can be performed by the two magnetic heads 13 and thus, in the step S7, magnetic data can be adequately recorded in the magnetic stripes 2b and 2d by the two magnetic heads 13 and, as a result, normal reading of magnetic data can be performed.

Further, as described above, when a card 2 accommodated in the card accommodation part 7 in a direction shown in FIG. 8C is taken into the card reader 4, in the card reader 4, normal recording of magnetic data to the magnetic stripes 2b and 2d and normal reading of magnetic data recorded in the magnetic stripes 2b and 2d can be performed by the two magnetic heads 13 and, in the card reader 3, normal recording of magnetic data to the magnetic stripe 2e and normal reading of magnetic data recorded in the magnetic stripe 2e can be performed by the magnetic head 13. In addition, in the card reader 4, normal data communication of the card reader 4 with the card 2 can be performed by using the IC contact block 14.

Therefore, when it is determined that normal reading of magnetic data has been performed by the two magnetic heads 13 in the step S8 (in other words, in the case of "Yes" in the step S8), the card issue device 1 stores that a front-rear direction and a right-left direction of the card 2 performed under the current determination process is inverted with respect to a correct direction of a card 2 accommodated in the card accommodation part 7 (step S9). In addition, the card issue device 1 erases magnetic data recorded to the card 2 in the step S7 and starts an issue process of the card 2.

On the other hand, in the step S8, when it is determined that normal reading of magnetic data has not been performed by at least one magnetic head 13 (in other words, in the case of "No" in the step S8), the card issue device 1 ejects the card 2 from the card reader 4 and inverts front and back sides of the card 2 by using the card conveyance mechanism 10 (step S10). Specifically, in the step S10, the card issue device 1 turns the card 2 with a shorter direction of the card 2 as an axial direction of turning to invert the front and back sides of the card 2.

After that, the card issue device 1 takes the card 2 whose front and back sides have been inverted into the card reader 4 again and recording and reading of magnetic data are performed on the card 2 (step S11). In the step S11, the card reader 4 performs recording of magnetic data to the card 2 by the two magnetic heads 13 of the card reader 4 while conveying the card 2 and then, reading of magnetic data is performed. After that, the card issue device 1 determines whether normal reading of magnetic data has been performed by the two magnetic heads 13 in the step S11 or not (step S12).

When a card 2 sent out from the card accommodation part 7 is accommodated in the card accommodation part 7 in a direction shown in FIG. 8D, in the step S11, the card 2 is taken into the card reader 3 in a direction shown in FIG. 8C. Therefore, when it is determined that normal reading of magnetic data has been performed by the two magnetic heads 13 in the step S12 (in other words, in the case of "Yes" in the step S12), the process advances to the step S9, and the card issue device 1 stores that a front-rear direction and a right-left direction of the card 2 performed under the current determination process is inverted with respect to a correct direction of a card 2 accommodated in the card accommodation part 7 and, after the card issue device 1 erases magnetic data recorded to the card 2 in the step S11, the card issue device 1 starts an issue process of the card 2.

On the other hand, in the step S12, when it is determined that normal reading of magnetic data has not been performed by at least one of the magnetic heads 13 (in other words, in the case of "No" in the step S12), the card issue device 1 determines that the card 2 sent out from the card accommodation part 7 has some abnormality and a card abnormality process is executed. For example, the card issue device 1 is stopped as an abnormal state. Alternatively, the card issue device 1 collects this card 2 to the card collection part 9 and sends a new card 2 out from the card accommodation part 7 and the process is returned to the step S1.

In an issue process of the card 2 in a case of "Yes" in the step S2 and in a case of "Yes" in the step S5, first, the card 2 is taken into the card reader 3 in a direction as it is. The card reader 3 performs recording of magnetic data to the magnetic stripes 2b and 2d and reading of magnetic data for confirming the recorded magnetic data. Further, the card reader 3 performs data communication with the card 2 by using the IC contact block 14. After that, the card 2 is ejected from the card reader 3 and, after the card 2 is conveyed by the card conveyance mechanism 10, the card 2 is taken into the card reader 4 in a direction as it is. The card reader 4 performs recording of magnetic data to the magnetic stripe 2e and reading of magnetic data for confirming the recorded magnetic data.

On the other hand, in an issue process of the card 2 in the case of "Yes" in the step S8 and in the case of "Yes" in the step S12 (in other words, in an issue process of the card 2 after the step S9 has been executed), first, the card 2 is taken into the card reader 4 in the direction as it is. The card reader 4 performs recording of magnetic data to the magnetic stripes 2b and 2d and reading of magnetic data for confirming the recorded magnetic data. Further, the card reader 4 performs data communication with the card 2 by using the IC contact block 14. After that, the card 2 is ejected from the card reader 4 and, after the card 2 is conveyed by the card conveyance mechanism 10, the card 2 is taken into the card reader 3 in a direction as it is. The card reader 3 performs recording of magnetic data to the magnetic stripe 2e and reading of magnetic data for confirming the recorded magnetic data.

In this embodiment, in an issue process of a card 2 in the case of "Yes" in the step S2 and in the case of "Yes" in the step S5, it may be structured that, after the card 2 has been taken into the card reader 4 and processed, the card 2 is taken into the card reader 3 and processed. Further, in an issue process of a card 2 in the case of "Yes" in the step S8 and in the case of "Yes" in the step S12, the card 2 may be taken into the card reader 4 and processed after the card 2 has been taken into the card reader 3 and processed.

Further, in an issue process of a card 2, it may be structured that recording of magnetic data to the magnetic stripes 2b and 2d is not performed and that recording of magnetic data to the magnetic stripe 2e is not performed. Further, in an issue process of a card 2, no data communication may be performed between the card reader 3 or the card reader 4 and a card 2 by using the IC contact block 14.

The card 2 which has finished the processes in the card readers 3 and 4 is conveyed by the card conveyance mechanism 10 and then, the card 2 is taken into the printer 5. The printer 5 prints an image on the card 2. When an image is to be printed on the card 2, the printer 5 determines a direction of an image which is to be printed on the card 2 depending on a direction of the card 2 taken into the printer 5. Specifically, in a case that a card 2 whose front face 2c faces an upper side and the one end face 2p in a longitudinal direction of the card 2 is disposed on the front side is taken into the printer 5 (in the case of the "Yes" in the step S2 and in the case of the "Yes" in the step S5), the printer 5 prints an image on the card 2 in a normal direction. On the other hand, in a case that a card 2 whose front face 2c faces an upper side and the other end face 2r in a longitudinal direction of the card 2 is disposed on the front side is taken into the printer 5 (in the case of the "Yes" in the step S8 and, in the case of the "Yes" in the step S12), the printer 5 prints an image which is turned by 180° from a normal direction on the card 2.

After that, the card 2 is ejected from the printer 5 and, after the card 2 is conveyed by the card conveyance mechanism 10, the card 2 is taken into the labeler 6. The labeler 6 sticks a label on the card 2. After that, the card 2 is ejected from the labeler 6 and is conveyed to the card taking-out part 8 by the card conveyance mechanism 10. Further, when the card 2 is ejected to the card taking-out part 8, an issue process of the card 2 is completed. In this case, in the issue process of the card 2, no image may be printed on the card 2 and no label may be stuck on the card 2.

The step S1 in this embodiment is a first recording step in which a card 2 sent out from the card accommodation part 7 is taken into the card reader 3 to perform recording and reading of magnetic data to and from the card 2, and the step S3 is a card inversion step in which, in a case that normal reading of magnetic data has not been performed in the step S1, the card 2 is ejected from the card reader 3 and the front and back sides of the card 2 are inverted, and the step S4 is a second recording-reading step in which the card 2 is taken into the card reader 3 after the step S3 to perform recording and reading of magnetic data to and from the card 2.

Further, the step S7 is a third recording-reading step in which, in a case that normal reading of magnetic data has not been performed in the step S4, the card 2 ejected from the card reader 3 is take into the card reader 4 to perform recording and reading of magnetic data to and from the card 2. The step S6 is a second card inversion step in which the card 2 is ejected from the card reader 3 and the front and back sides of the card 2 are inverted before the step S7. In addition, the step S10 is a third card inversion step in which, in a case that normal reading of magnetic data has not been performed in the step S7, the card 2 is ejected from the card reader 4 and the front and back sides of the card 2 are inverted. The step S11 is a fourth recording-reading step in which the card 2 is taken into the card reader 4 after the step S10 to perform recording and reading of magnetic data to and from the card 2.

Further, the steps S1 through S12 in this embodiment are a card direction determination step in which a card 2 is taken into the card readers 3 and 4 before the card 2 is issued to execute a determination process for determining a direction of the card 2. In the card direction determination step, recording and reading of magnetic data to and from a card 2 are performed by the card readers 3 and 4 and, based on a reading result of the magnetic data, a direction of the card 2 is determined. Specifically, in the card direction determination step, it is determined that a direction of a card 2 accommodated in the card accommodation part 7 is which of the directions shown in FIG. 8A through FIG. 8D.

Further, in this embodiment, the step in which an issue process of a card 2 is executed is a card issue step which executes an issue process of a card 2 based on a result of a determination process in the card direction determination step. As described above, a control method of the card issue device 1 in this embodiment includes a card direction determination step and a card issue step. Further, a step in which the printer 5 prints an image on a card 2 in the card issue step is a printing step and, in the printing step, based on a result of the determination process in the card direction determination step, a direction of the image printed on the card 2 is determined.

Principal Effects in this Embodiment

As described above, in this embodiment, a determination process in which a card 2 is taken into the card readers 3 and 4 before the card 2 is issued and a direction of the card 2 is determined is executed, and an issue process of the card 2 is executed based on a result of the determination process. Therefore, in this embodiment, an appropriate issue process of a card 2 can be performed according to a direction of the card 2 which is accommodated in the card accommodation part 7. Accordingly, in this embodiment, even when a card 2 is accommodated in the card accommodation part 7 in an incorrect direction, the card 2 can be issued.

In this embodiment, in the step S1, a card 2 sent out from the card accommodation part 7 is taken into the card reader 3 and recording and reading of magnetic data to and from the card 2 are performed and, in a case that normal reading of magnetic data has not been performed in the step S1, in the step S4, the card 2 whose front and back sides are inverted is taken into the card reader 3 and recording and reading of magnetic data to and from the card 2 are performed. Therefore, according to this embodiment, a front-back direction of the card 2 can be determined. Accordingly, in this embodiment, even when a card 2 is accommodated in the card accommodation part 7 in a state that a front-back direction of the card 2 is incorrect, recording of magnetic data is adequately performed on the card 2 and thus, the card 2 can be issued.

Further, in this embodiment, two magnetic heads 13 of the card reader 3 are disposed on a left rear end side of the card reader 3 and two magnetic heads 13 of the card reader 4 are disposed on a right front end side of the card reader 4 and, in a case that normal reading of magnetic data has not been performed in the step S4, in the step S7, the card 2 is taken into the card reader 4 and recording and reading of magnetic data to and from the card 2 are performed. Therefore, according to this embodiment, a front-rear direction of the card 2 can be determined. Accordingly, in this embodiment, even when a card 2 is accommodated in the card accommodation part 7 in a state that a front-rear direction of the card 2 is incorrect, recording of magnetic data can be adequately performed to issue a card 2.

In other words, according to this embodiment, even when a card 2 is accommodated in the card accommodation part 7 in a state that a front-rear direction and a front-back direction of the card 2 are inverted with respect to a correct direction of the card 2 accommodated in the card accommodation part 7 and, further, even when a card 2 is accommodated in the card accommodation part 7 in a state that a front-rear direction and a right-left direction of the card 2 are inverted with respect to a correct direction of the card 2 accommodated in the card accommodation part 7 and, in addition, even when a card 2 is accommodated in the card accommodation part 7 in a state that a right-left direction and a front-back direction of the card 2 are inverted with respect to a correct direction of the card 2 accommodated in the card accommodation part 7, recording of magnetic data can be adequately performed to issue the card 2.

In this embodiment, in a case that normal reading of magnetic data has not been performed in the step S7, in the step S11, the card 2 whose front and back sides are inverted is taken into the card reader 4 and recording and reading of magnetic data to and from the card 2 are performed and, when the card 2 sent out from the accommodation part 7 has some abnormality, normal reading of magnetic data has not performed also in the step S11. Therefore, according to this embodiment, based on a reading result of magnetic data in the step S11, it can be determined whether the card 2 sent out from the card accommodation part 7 has some abnormality or not. For example, it can be determined whether a card 2 sent out from the card accommodation part 7 is a different type of card 2 from a card 2 which is to be issued. Alternatively, it can be determined whether damage occurs in a card 2 sent out from the card accommodation part 7 or not.

In this embodiment, the printer 5 determines a direction of an image printed on a card 2 depending on a direction of the card 2 taken into the printer 5 and prints the image on the card 2. Therefore, according to this embodiment, even when a card 2 is accommodated in the card accommodation part 7 in a state that a front-rear direction of the card 2 is incorrect, an appropriate image can be printed on the card 2 by using a common printer 5.

MODIFIED EXAMPLES OF CARD

In the embodiment described above, a card 2 which is issued in the card issue device 1 is a card 2 of No. 8 in the list shown in FIG. 5. However, other cards 2 in the list shown in FIG. 5 may be issued in the card issue device 1. In a case that one of cards 2 grouped into the "Group 1" in the list shown in FIG. 5 (card 2 of No. 2 through No. 4, No. 7, No. 10, No. 12, No. 14 and No. 15) is issued in the card issue device 1, for example, the card issue device 1 executes the card direction determination steps S1 through S12 which are the same as the embodiment described above before the card 2 is issued and a direction of the card 2 is determined. However, depending on a type of card 2, in the steps S1 and the like, the card issue device 1 performs recording and reading of magnetic data to and from a card 2 by using one magnetic head 13.

Further, in a case that one of cards 2 grouped into the "Group 2" in the list shown in FIG. 5 (card 2 of No. 5, No. 9 and No. 13) is issued in the card issue device 1, for example, the card issue device 1 executes the card direction determination steps S1 through S12 which are substantially similar to the embodiment described above before the card 2 is issued and a direction of the card 2 is determined. However, in this case, for example, the card issue device 1 takes a card 2 into the card reader 4 and recording and reading of magnetic data to and from the card 2 are performed in the steps S1 and S4 and, in the steps S7 and S11, the card 2 is taken into the card reader 3 and recording and reading of magnetic data to and from the card 2 are performed. In this case, the card reader 3 is the second card reader and the card reader 4 is the first card reader. Further, in this case, depending on a type of card 2, in the steps S1 and the like, the card issue device 1 performs recording and reading of magnetic data to and from a card 2 by using one magnetic head 13.

Further, in a case that one of cards 2 grouped into the "Group 3" in the list shown in FIG. 5 (card 2 of No. 6, No. 11 and No. 16) is issued in the card issue device 1, a front-back direction of the card 2 can be determined, but a front-rear direction of the card 2 cannot be determined. Therefore, in this case, for example, the card issue device 1 executes a card direction determination step comprised of the steps S1 through S5 before the card 2 is issued to determine a direction of the card 2. In this case, in the case of "No" in the step S5, the card issue device 1 executes a card abnormality process. Further, in this case, depending on a type of card 2, in the steps S1 and the like, the card issue device 1 performs recording and reading of magnetic data to and from a card 2 by using one magnetic head 13.

Further, in a case that a card 2 grouped into the "Group 0" in the list shown in FIG. 5 (card 2 of No. 1) is issued in the card issue device 1, a front-back direction of the card 2 and a front-rear direction of the card 2 cannot be determined. In this case, the card issue device 1 starts an issue process of a card 2 without executing a card direction determination step.

Further, the five card accommodation parts 7 may include a card accommodation part 7 in which cards 2 whose type of card is different from others (card 2 of different "No." in the list shown in FIG. 5) are accommodated. In other words, the card issue device 1 may issue a plurality of types of cards 2 which have different "No." in the list shown in FIG. 5. In this case, each of the card accommodation parts 7 accommodates the same type of card 2. Further, in this case, an issue instruction of a card 2 from a host apparatus includes the "No." of the card 2 to be issued and the card issue device 1 sends a card 2 out from the card accommodation part 7 corresponding to the "No." of the card 2 included in the issue instruction of the card 2 and executes the card direction determination step corresponding to the "No." of the card 2 included in the issue instruction of the card 2.

Other Embodiments

Although the present invention has been shown and described with reference to a specific embodiment, various changes and modifications will be apparent to those skilled in the art from the teachings herein.

In the embodiment described above, in a case that normal reading of magnetic data has not been performed in the step S1 (in other words, in the case of "No" in the step S2), it may be structured that the card issue device 1 ejects the card 2 from the card reader 3 and executes a sixth recording-reading step in which the card 2 is taken into the card reader 4 and recording and reading of magnetic data to and from the card 2 are performed. In this case, a front-rear direction of the card 2 can be determined. Therefore, even when a card 2 is accommodated in the card accommodation part 7 in a state that a front-rear direction of the card 2 is incorrect, recording of magnetic data is adequately performed on the card 2 and the card 2 can be issued.

Further, in a case that normal reading of magnetic data has not been performed in the sixth recording-reading step, it may be structured that the card issue device 1 executes the fourth card inversion step in which the card 2 is ejected from the card reader 4 and the front and back sides of the card 2 are inverted by the card conveyance mechanism 10, and the seventh recording-reading step in which the card 2 is taken into the card reader 3 or the card reader 4 after the fourth card inversion step and recording and reading of magnetic data to and from the card 2 are performed. In this case, a front-back direction of the card 2 can be also determined.

Therefore, similarly to the embodiment described above, even when a card 2 is accommodated in the card accommodation part 7 in a state that a front-rear direction and a front-back direction of the card 2 are inverted with respect to a correct direction of the card 2 accommodated in the card accommodation part 7 and, further, even when a card 2 is accommodated in the card accommodation part 7 in a state that a front-rear direction and a right-left direction of the card 2 are inverted with respect to the correct direction of the card 2 accommodated in the card accommodation part 7 and, in addition, even when a card 2 is accommodated in the card accommodation part 7 in a state that a right-left direction and a front-back direction of the card 2 are inverted with respect to the correct direction of the card 2 accommodated in the card accommodation part 7, recording of magnetic data is adequately performed on the card 2 and the card 2 can be issued.

In the embodiment described above, in the card direction determination step, recording and reading of magnetic data to and from a card 2 are performed in the card readers 3 and 4 and a direction of the card 2 is determined based on a reading result of the magnetic data. However, it may be structured that, in the card direction determination step, activation processing of a card 2 is performed in the card reader 1 and a direction of the card 2 is determined based on a result of the activation processing.

In other words, it may be structured that, in the steps S1 and S4, the card issue device 1 makes a card 2 taken into the card reader 3 contact with the IC contacts to perform activation processing of the card 2 and, in the steps S7 and S11, the card issue device 1 makes the card 2 taken into the card reader 4 contact with the IC contacts to perform activation processing of the card 2 and, in the steps S2, S5, S8 and S12, it is determined whether the card 2 has been activated or not. In this case, no magnetic stripes 2b, 2d and 2e may be formed on a card 2. In other words, a card 2 is not required to be a magnetic card.

Further, it may be structured that the card issue device 1 performs recording and reading of magnetic data to and from a card 2 and performs activation processing of the card 2 in the card readers 3 and 4 in the card direction determination step, and a direction of the card 2 is determined based on a reading result of the magnetic data and a result of the activation processing. In other words, the card issue device 1 may determine a direction of a card 2 based on a combination of a reading result of magnetic data and a result of the activation processing in the card direction determination step.

Further, for example, in a case that the card reader 3 is provided with a scanner 30 (see two-dot chain line in FIG. 2) for acquiring an image of a card 2, in the card direction determination step, the card issue device 1 may acquire the image of the card 2 in the card reader 3 and determines a direction of the card 2 based on the acquired image. In this case, a direction of a card 2 can be determined by acquiring an image of the card 2 only once. In this case, a card 2 is not required to be a magnetic card and is not required to be an IC card.

In the embodiment described above, in the case that the card issue device 1 has normally read magnetic data in the steps S2, S5, S8 and S12, the card issue device 1 finishes determination of a direction of a card 2 and proceeds to an issue process of the card 2. However, the card issue device 1 may be structured so that, in a case that normal reading of magnetic data has not been performed, the card issue device 1 finishes determination of a direction of a card 2 depending on a reading condition of magnetic data and proceeds to an issue process of the card 2.

For example, in the step S1, in a case that, although normal reading of magnetic data has not been performed by one of the two magnetic heads 13 of the card reader 3, normal reading of magnetic data has been performed by the other magnetic head 13, it is assumed that the card 2 is accommodated in the card accommodation part 7 in a state shown in FIG. 8C and thus, in this case, the process may be advanced to the step S9. Further, for example, in the case of "No" in the step S8, it is assumed that the card 2 is accommodated in the card accommodation part 7 in a state shown in FIG. 8D and thus, in this case, it may be structured that the step S10 is executed and then, the process is advanced to the step S9. Further, in the case of "No" in the step S8, the card issue device 1 may store that a front-rear direction of the card 2 is correct but a front-back direction of the card 2 is inverted and then, the card issue device 1 may start an issue process of the card 2.

In the embodiment described above, the card issue device 1 is provided with no card reader 3 or no card reader 4. Further, in the embodiment described above, in the case of "No" in the step S5, the card abnormality process may be executed. Even in this case, a front-back direction of the card 2 can be determined. Further, in the embodiment described above, the card conveyance mechanism 10 may be provided with no function for inverting the front and back sides of a card 2. Even in this case, a front-rear direction of a card 2 can be determined.

In the embodiment described above, in the case of "No" in the step S5, the process may be advanced to the step S7 without inverting the front and back sides of the card 2. Further, in the embodiment described above, the card conveyance mechanism 10 inverts the front and back sides of a card 2. However, the card issue device 1 may be provided with a card inversion mechanism structured to invert the front and back sides of a card 2 which is separately provided from the card conveyance mechanism 10. Further, in the embodiment described above, the card reader 3 and the card reader 4 are structured similarly to each other. However, the structure of the card reader 3 and the structure of the card reader 4 may be different from each other.

In the embodiment described above, the number of the card accommodation parts 7 provided in the card issue device 1 may be not more than 4, or not less than 6. Further, in the embodiment described above, the card issue device 1 may be provided with three or more card readers. Further, in the embodiment described above, a card 2 is not required to be incorporated with an IC chip, and a card 2 may be a PET (polyethylene terephthalate) card whose thickness is about 0.18-0.36 mm or may be a paper card having a predetermined thickness.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A control method of a card issue device comprising a card accommodation part in which a card before issue is accommodated and a card reader structured to perform at least one of reading of data recorded in the card and recording of data to the card, the control method comprising:
a card direction determination step comprising taking the card into the card reader before the card is issued and determining a direction of the card; and
a card issue step comprising issuing the card is executed based on the card direction determined in the card direction determination step,
wherein
the card is magnetic card comprising a magnetic stripe in which magnetic data is recorded,
the card reader comprises a magnetic head which performs recording of magnetic data to the card and reading of magnetic data recorded to the card,
in the card direction determination step, recording and reading of magnetic data to and from the card are performed in the card reader and the direction of the card is determined based on a reading result of the magnetic data,
the card issue device comprises a card inversion mechanism structured to invert front and back sides of the card,
the card direction determination step comprises:
a first recording-reading step comprising taking the card sent out from the card accommodation part into the card reader to perform recording and reading of magnetic data to and from the card;
a card inversion step comprising, in a case that normal reading of the magnetic data has not been performed in the first recording-reading step, ejecting the card from the card reader and inverting the front and back sides of the card by the card inversion mechanism; and
a second recording-reading step comprising taking the card into the card reader after the card inversion step to perform recording and reading of magnetic data to and from the card, and
the card issue device comprises a first card reader and a second card reader as the card reader,
a conveyance direction of the card conveyed in the first card reader and a conveyance direction of the card conveyed in the second card reader are parallel to each other,
when a direction perpendicular to the conveyance direction of the card and a thickness direction of the card conveyed is defined as a width direction of the card,
the card to be issued is taken into the first card reader and the second card reader from one side in the conveyance direction of the card,
the magnetic head of the first card reader is disposed on one side in the width direction of the card, and the magnetic head of the second card reader is disposed on an other side in the width direction of the card,
in the first recording-reading step and the second recording-reading step, the card is taken into the first card reader, and
the card direction determination step comprises a third recording-reading step comprising, in a case that normal reading of magnetic data has not been performed in the second recording-reading step, taking the card ejected from the first card reader into the second card reader to perform recording and reading of magnetic data to and from the card.

2. The control method of the card issue device according to wherein
the card direction determination step comprises a second card inversion step comprising, before the third recording-reading step, ejecting the card from the first card reader and inverting the front and back sides of the card by the card inversion mechanism, and
in a case that normal reading of magnetic data has not been performed in the second recording-reading step, the second card inversion step is executed and the third recording-reading step is executed after the second card inversion step.

3. The control method of the card issue device according to claim 2, wherein
the card direction determination step comprises, in a case that normal reading of magnetic data has not been performed in the third recording-reading step:

a third card inversion step comprising ejecting the card is ejected from the second card reader and inverting the front and back sides of the card by the card inversion mechanism; and a fourth recording-reading step comprising taking the card is taken into the second card reader after the third card inversion step to perform recording and reading of magnetic data to and from the card.

4. The control method of the card issue device according to claim 3, wherein the card issue device comprises a printer structured to print an image on the card, the card issue step comprises a printing step comprising printing the image on the card by the printer, and in the printing step, a direction of the image to be printed on the card is determined based on the result of the determination process in the card direction determination step.

5. The control method of the card issue device according to claim 1, wherein the card further comprises an IC chip and an outside connection terminal of the IC chip, the card reader further comprises:
an IC contact block having a plurality of IC contact springs structured to contact with the outside connection terminal, and in the card direction determination step, recording and reading of magnetic data to and from the card and activation processing of the card are performed in the card reader and the direction of the card is determined based on the reading result of the magnetic data and a result of the activation processing.

6. The control method of the card issue device according to claim 1, wherein the card reader comprises a scanner structured to acquire an image of the card, and in the card direction determination step, the image of the card is acquired in the card reader and the direction of the card is determined based on an acquired image.

7. The control method of the card issue device according to claim 1, wherein the card issue device comprises a printer structured to print an image on the card, the card issue step comprises a printing step comprising printing the on the card by the printer, and in the printing step, a direction of the image to be printed on the card is determined based on the result of the determination process in the card direction determination step.

8. The control method of the card issue device according to claim 1 wherein the card direction determination step comprises, in a case that normal reading of magnetic data has not been performed in the third recording-reading step:

a third card inversion step comprising ejecting the card from the second card reader and inverting the front and back sides of the card by the card inversion mechanism; and a fourth recording-reading step comprising taking the card into the second card reader after the third card inversion step to perform recording and reading of magnetic data to and from the card.

9. The control method of the card issue device according to claim 8, wherein the card issue device comprises a printer structured to print an image on the card, the card issue step comprises a printing step comprising printing the image on the card by the printer, and in the printing step, a direction of the image to be printed on the card is determined based on the result of the determination process in the card direction determination step.

10. The control method of the card issue device according to claim 1, wherein the card issue device comprises a printer structured to print an image on the card, the card issue step comprises a printing step comprising printing the image on the card by the printer, and in the printing step, a direction of the image to be printed on the card is determined based on the result of the determination process in the card direction determination step.

11. A control method of a card issue device comprising a card accommodation part in which a card before issue is accommodated and a card reader structured to perform at least one of reading of data recorded in the card and recording of fata to the card, the control method comprising:

a card direction determination step comprising taking the card into the card reader before the car is issued and determining a direction of the card; and a card issue step comprising issuing the card is executed based on the card direction determined in the card direction determination step, wherein the card is a magnetic card comprising a magnetic stripe in which magnetic data is recorded, the card reader comprises a magnetic head which performs recoding of magnetic data to the card and reading of magnetic fata recorded to the card, in the card direction determination step, recording and reading of magnetic data to and from the card are performed in the card reader and the direction of the card is determined based on a reading result of the magnetic data, the card issue device comprises a first card reader and a second card reader as the card reader, a conveyance direction of the card conveyed in the first card reader and a conveyance direction of the card conveyed in the second card reader are parallel to each other, when a direction perpendicular to the conveyance direction of the card and a thickness direction of the card conveyed is defined as a width direction of the card, the card to be issued is taken into the first card reader and the second card reader from one side in the conveyance direction of the card, the magnetic head of the first card reader is disposed on one side in the width direction of the card, and the magnetic head of the second card reader is disposed on an other side in the width direction of the card, the card direction determination step comprises:
a fifth recording-reading step comprising taking the card sent out from the card accommodation part into the first card reader to perform recording and reading of magnetic data to and from the card; and a sixth recording-reading step comprising, in a case that normal reading of magnetic data has not been performed in the fifth recording-reading step, ejecting the card from the first card reader and taking the card ejected from the first card reader into the second card reader to perform recording and reading of magnetic data to and from the card.

12. The control method of the card issue device according to claim 11, wherein
the card issue device comprises a card inversion mechanism structured to invert front and back sides of the card, and
the card direction determination step comprises:
a fourth card inversion step comprising, in a case that normal reading of the magnetic data has not been performed in the sixth recording-reading step, ejecting the card from the second card reader and inverting the front and back sides of the card by the card inversion mechanism; and
a seventh recording-reading step comprising taking the card into the first card reader or the second card reader after the fourth card inversion step to perform recording and reading of magnetic data to and from the card.

13. The control method of the card issue device according to claim 12, wherein
the card issue device comprises a printer structured to print an image on the card,
the card issue step comprises a printing step comprising printing the image on the card by the printer, and
in the printing step, a direction of the image to be printed on the card is determined based on the result of the determination process in the card direction determination step.

14. The control method of the card issue device according to claim 11 wherein
the card issue device comprises a printer structured to print an image on the card,
the card issue step comprises a printing step comprising printing the image on the card by the printer, and
in the printing step, a direction of the image to be printed on the card is determined based on the result of the determination process in the card direction determination step.

15. A card issue device comprising:
a card accommodation part in which a card before issue is accommodated; and
a card reader structured to perform at least one of reading of data recorded in the card and recording of data to the card;
wherein a determination process in which the card is taken into the card reader before the card is issued and a direction of the card is determined is executed,
an issue process of the card is executed based on a result of the determination process,
the card is a magnetic card comprising a magnetic stripe in which magnetic data is recorded,
the card reader comprises a magnetic head which performs recording of magnetic data to the card and reading of magnetic data recorded to the card,
recording and reading of magnetic data to and from the card are performed in the card reader and the direction of the card is determined based on a reading result of the magnetic data,
the card issue device comprises a first card reader and a second card reader as the card reader,
a conveyance direction of the card conveyed in the first card reader and a conveyance direction of the card conveyed in the second card reader are parallel to each other,
when a direction perpendicular to the conveyance direction of the card and a thickness direction of the cared conveyed is defined as a width direction of the card,
the card to be issued is taken into the first card reader and the second card reader from one side in the conveyance direction of the card,
the magnetic head of the first card reader is disposed on one side in the width direction of the card, and the magnetic head of the second card reader is disposed on an other side in the width direction of the card,
in the determination process, the card is sent out from the card accommodation part into the first card reader to perform recording and reading of magnetic data to and from the card; and
in a case that normal reading of magnetic data has not been performed in the fifth recording-reading step, the card is ejected from the first card reader and the card ejected from the first card reader is taken into the second card reader to perform recording and reading of magnetic data to and from the card.

* * * * *